(12) United States Patent
Rainish et al.

(10) Patent No.: US 6,751,451 B2
(45) Date of Patent: *Jun. 15, 2004

(54) METHOD AND DEVICE FOR MANAGING POWER CONSUMPTION OF A RECEIVER IN STAND-BY MODE

(75) Inventors: Doron Rainish, Ramat Gan (IL); Shlomo Shamai, Tel Aviv (IL); Yona Perets, Ra'anana (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/100,190

(22) Filed: Mar. 19, 2002

(65) Prior Publication Data

US 2002/0155866 A1 Oct. 24, 2002

Related U.S. Application Data

(63) Continuation of application No. 09/285,274, filed on Apr. 2, 1999, now Pat. No. 6,381,450.

(51) Int. Cl.⁷ .................................................. H04B 1/16
(52) U.S. Cl. ..................................... 455/343.1; 455/574
(58) Field of Search ........................... 455/343.1, 574, 455/422, 517, 68, 62, 573; 375/224, 225; 340/7.35; 370/311, 337

(56) References Cited

U.S. PATENT DOCUMENTS

| | | | |
|---|---|---|---|
| 4,398,192 A | 8/1983 | Moore et al. | |
| 5,031,231 A | 7/1991 | Miyazaki | |
| 5,051,999 A | * 9/1991 | Erhart et al. ................. | 714/774 |
| 5,058,203 A | 10/1991 | Inagami | |
| 5,140,698 A | 8/1992 | Toko | |
| 5,144,296 A | * 9/1992 | DeLuca et al. ............ | 340/7.35 |
| 5,175,874 A | 12/1992 | Auchter | |
| 5,224,152 A | 6/1993 | Harte | |
| 5,230,003 A | 7/1993 | Dent | |
| 5,241,542 A | 8/1993 | Natarajan et al. | |
| 5,278,831 A | 1/1994 | Mabey et al. | |
| 5,384,782 A | * 1/1995 | Elms .......................... | 714/701 |
| 5,406,613 A | 4/1995 | Peponides et al. | |
| 5,566,206 A | 10/1996 | Butler | |
| 5,568,513 A | 10/1996 | Croft et al. | |
| 5,701,329 A | 12/1997 | Croft et al. | |

(List continued on next page.)

FOREIGN PATENT DOCUMENTS

EP          0 473 465 A1        5/1991

OTHER PUBLICATIONS

Proakis, John G. Ph.D., *Digital Communications*, McGraw–Hill Inc. New York 1995. Pp. 2–21.

Buda, Fabien, Fang, Juing Sehier, Philippe, "Soft Decoding of BCH Codes Applied to Multilevel Modulation Codes for Rayleigh Fading Channels". Milcom 1997 vol. 1. Pp32–36.

Wilson, Stephen G., *Digital Modulation and Coding*, Prentice Hall Inc. New Jersey 1996. Pp. 465–489.

Chase, David, "A Class of Algorithms for Decoding Block Codes with Channel Measurement Information". IEEE Transactions on Information Theory, vol. IT–18, No. 1, Jan. 1972. Pp. 170–181.

Costillo, Daniel, Lin, Shu, *Error Control Coding*, Prentice-Hall, Inc. Englewood Cliffs, New Jersey, 1983, pp. 58–59, 256–267.

*Primary Examiner*—Charles Appiah
(74) *Attorney, Agent, or Firm*—Michael A. Proksch (57) ABSTRACT

Some embodiments of the present invention are directed to a device having a soft decoder to produce a codeword by soft decoding one or more repetitions of a word received by a receiver and a power reducer to reduce power to the receiver when a message contained in the codeword is not addressed to the receiver.

22 Claims, 11 Drawing Sheets

U.S. PATENT DOCUMENTS

| | | | |
|---|---|---|---|
| 5,838,267 A | * 11/1998 | Wang et al. | 341/94 |
| 5,978,366 A | * 11/1999 | Massingill et al. | 370/337 |
| 6,035,007 A | * 3/2000 | Khayrallah et al. | 375/341 |
| 6,157,816 A | * 12/2000 | Anderson et al. | 340/7.32 |
| 6,192,230 B1 | * 2/2001 | van Bokhorst et al. | 455/343 |
| 6,240,304 B1 | * 5/2001 | Blankenstein et al. | 455/574 |
| 6,259,681 B1 | * 7/2001 | Kolev et al. | 370/311 |
| 6,324,668 B1 | * 11/2001 | Classon | 714/783 |
| 6,381,450 B1 | 4/2002 | Perets et al. | |
| 6,434,376 B1 | * 8/2002 | Black | 455/343 |

* cited by examiner

METHOD AND DEVICE FOR MANAGING POWER CONSUMPTION OF A RECEIVER IN STAND-BY MODE

CROSS REFERENCE TO RELATED APPLICATIONS

This application is a continuation application of U.S. application Ser. No. 09/285,274, filed Apr. 2, 1999, now U.S. Pat. No. 6,381,450 issued Apr. 30, 2002.

FIELD OF THE INVENTION

The present invention relates to a method for reducing power consumption of analog receivers, in general, and to a method for reducing power consumption of an analog receiver in stand-by mode, in particular.

BACKGROUND OF THE INVENTION

Cellular telephone systems are based upon communications between mobile stations, e.g. cellular telephones, and base stations. Each base station provides coverage for a geographical cell, which typically is between 3 and 24 square kilometers, and has approximately 420 channels (frequencies) available for communication, math a capacity of 40–50 conversations per cell. One of the channels, known as the forward control channel (FOCC), is used for control communication from the base station to all of the mobile telephones in the cell. Another channel, known as the reverse control channel (RECC), is used for control communication from all of the mobile telephones in the cell to the base station. The remaining channels are used for voice communications.

A base station uses the FOCC to send a continuous wideband data stream to the mobile telephones. Messages transmitted over the FOCC are mobile telephone control messages, broadcast messages, or filler messages. An example of a mobile telephone control message is a beckoning message notifying mobile telephones in the cell that a call has come in for a particular telephone number. Mobile telephones in stand-by mode attempt to detect the beckoning message from the base station. When the mobile telephone being beckoned detects that it is being called, it uses the RECC to notify the base station. The base station then uses the FOCC to notify the mobile telephone which additional channel to use for voice communications, and the mobile telephone switches operation from stand-by to talk mode.

Figure 1:
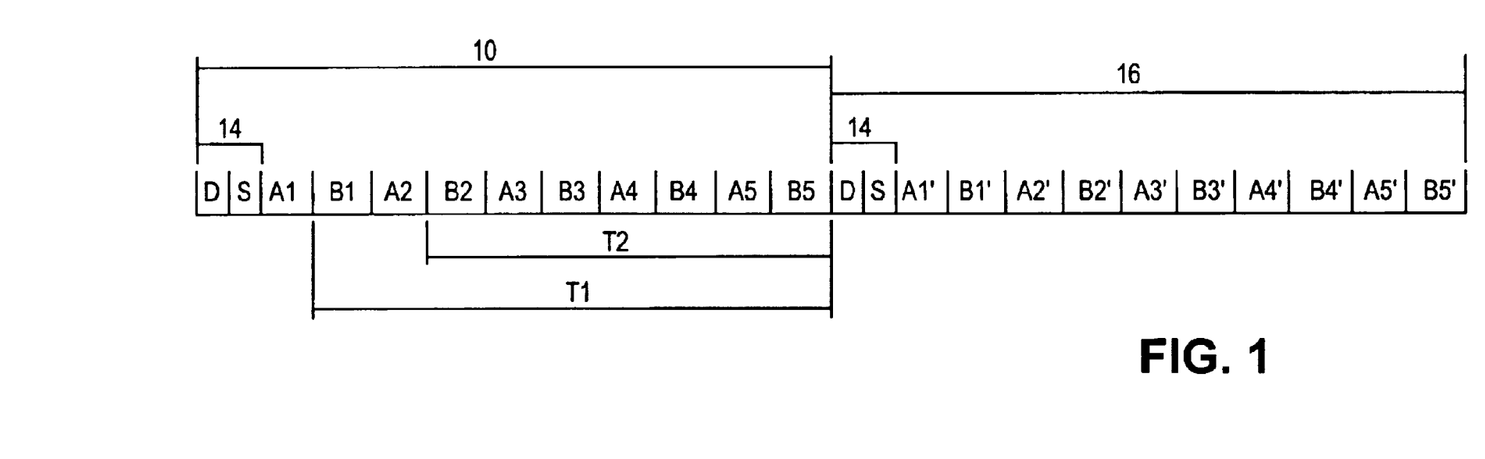
FIG. 1 is a schematic illustration of a format of the messages transmitted over the FOCC.

Reference is now made to FIG. 1, which is a schematic illustration of a format of the messages transmitted over the FOCC. A message is sent in word blocks, a first word block 10 comprising a preamble 14, five repetitions A1, A2, A3, A4, A5 of a first word A, and five repetitions B1, B2, B3, B4, B5 of a second word B, interleaved with the repetitions of the word A. The base station actually Knits two messages, one composed of A-words and one composed of B-words. A given mobile telephone listens to only one of the messages (A or B), according to its unique identification number. A subsequent word block 16 comprises a preamble 14, five repetitions A1', A2', A3', A4', A5' of a word A', and five repetitions B1', B2', B3', B4', B5' of a word B', interleaved with the repetitions of the word A'.

The preamble 14 comprises a standard, fixed, 10-bit dotting sequence D and a standard, fixed, 11-bit word sync sequence S, used to permit mobile telephones to synchronize with the incoming data.

Figure 2:
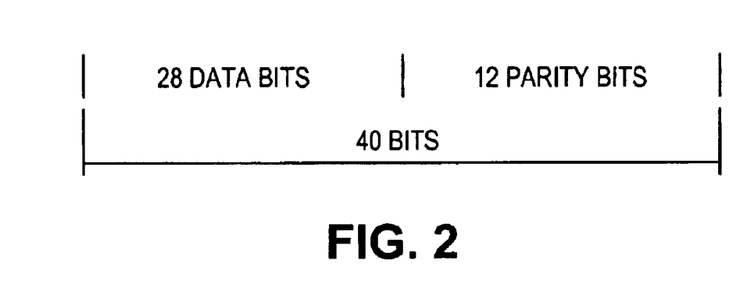
FIG. 2 is a schematic illustration of a bit structure of a word.

Reference is now made to FIG. 2, which is a schematic illustration of a bit structure of a word. Each word contains 40 bits, formed by encoding 28 data bits with 12 parity bits according to the BCH (Bose-Chaudhuri-Hocquenghem) encoding technique, which is well known in the art, and is a particular example of block coding. The 40-bit words, created by BCH encoding different sets of 28 data bits, differ by at least 5 bits. If no more than two errors are introduced into the 40-bit words, for example due to noise during transmission, then the BCH decoder can correct the errors and still accurately reproduce the 28 data bits. If there are more than two errors, the BCH decoder cannot accurately decode the 40-bit word. In this case, either the BCH decoder fails to decode the 40-bit word, claiming too many errors, or a false alarm occurs, in which the BCH decoder gives the wrong 28 data bits and claims that there are no uncorrected errors.

A mobile telephone contains a BCH decoder to decode the 40-bit words received from the base station Five repetitions of each 40-bit word are sent in order to improve the transfer reliability. A conventional technique for decoding the five repetitions of a word is majority voting, which is well known in the art. For each bit in the word, having a value of say, 0 or 1, it is always possible to choose the value that is repeated the most. The result of the majority voting is then BCH decoded. A lost message occurs when the mobile telephone fails to successfully decode the 40-bit word, even after five repetitions.

A conventional mobile telephone in stand-by mode operates its receiver continuously receiving messages from the base station and determining whether the messages are addressed to it. It will be appreciated that keeping the receiver on continuously consumes a considerable amount of power, which is of limited supply when the mobile telephone is battery-operated.

There are a number of methods for reducing the power consumption of a receiver in stand-by mode. U.S. Pat. No. 5,140,698 to Toko describes a power saving method in a mobile telephone system. According to Toko, a receiver in stand-by mode that listens only to A-words saves power during those portions of the FOCC message composed of B-words.

U.S. Pat. No. 5,224,152 to Harte describes a different power saving arrangement and method in a portable cellular telephone system. According to Harte, a receiver in stand-by mode decodes each word as it is received. Referring back to FIG. 1, if the BCH decoder successfully decodes A1, and the mobile telephone determines that the A-word is not addressed to it, then the time T1 remaining until the next dotting signal D is calculated, and the power to the receiver is reduced during the time period T1. If the BCH decoder does not successfully decode A1, then the receiver remains at full power. If the BCH decoder successfully decodes A2 when it is received, and the mobile telephone determines that the A-word is not addressed to it, then the time T2 remaining until the next dotting signal D is calculated, and the power to the receiver is reduced during the time period T2.

It will be appreciated that according to Harte, once a repetition of a 40-bit word is not successfully decoded, the information contained therein is not used further to decode subsequent repetitions.

It will also be appreciated by those skilled in the art that when the FOCC is relatively noisy, the device disclosed by Harte will spend relatively little time in the low-power state. More importantly, it will suffer from a higher rate of lost messages than conventional mobile telephones that do majority voting.

U.S. Pat. No. 5,175,874 to Auchter describes a power saving method in which the receiver reduces power as soon as two copies of a word leave been successfully decoded and are identical. It will be appreciated that if the FOCC has a low noise level, then a device according to Auchter will remain at full power for longer periods of time than a device according to Harte.

Another method for reducing the power consumption of a receiver in stand-by mode is described in U.S. Pat. No. 5,568,513 to Croft et al. Croft uses soft bits, which are decision variables containing information about the quality of the bits. In conventional analog mobile telephones, the analog signal received by the telephone receiver is filtered, converted to a digital signal, and then filtered by a Manchester demodulator, resulting in soft bits. Be soft bits are quantized, and the resulting hard bits (having one of two values, say 0 and 1) are decoded. Referring back to FIG. 1, Croft discloses a method whereby the soft bits of A1 are quantized, and then the hard bits of sword A1 are BCH decoded. Croft calculates the syndrome of the 40-bit word A1, using a well-known technique similar to that described in Lin, Costello, *Error Control Coding Fundamentals and Applications*, Prentice Hall (1983), pp. 58–60. The syndrome indicates whether the 40 bits are error free, or whether there is a single error, or whether there is more than a single error. In the case of a single error, the syndrome also indicates in which of the 40 bits the error occurs, and Croft corrects the error. Croft refers to the error-free state or the corrected-single-error state as a successful cyclic redundancy check (CRC), and refers to the multiple-errors state as an unsuccessful CRC. If the CRC of A1 is successful, and the word A is not addressed to the mobile telephone, then the power to the receiver is reduced until the next dotting and sync sequence is expected. If the CRC of A1 indicates that there are uncorrected errors, then the soft bits of A2 are accumulated with the soft bits of A1, the sum is quantized, and the resulting hard bits are BCH decoded. If the CRC of the result is successful, and the word A is not addressed to the mobile telephone, then the power to the receiver is reduced until the next dotting and sync sequence is expected.

Croft teaches a cumulative majority vote in which soft bits are added together. Given a particular signal-to-noise ratio (SNR), a device according to Croft reduces power to the receiver for longer periods of time and has fewer lost messages than a device according to Harte.

U.S. Pat. No. 5,406,613 to Peponides et al. describes yet another power saving method and apparatus for cellular telephones. Like Croft, Peponides teaches adding soft bits together prior to BCH decoding. However, Peponides also uses the VSP (variance of signal power), which is a measure of the noise in the signal, to determine whether to accept a received word. If there is too much noise, the word is rejected. If the noise is acceptable, then the word is soft combined with previous words whose noise is acceptable. Soft bits in the combination whose amplitudes are too small are declared erasures, and if the word has too many erasures, then the next word is received as well. If the number of erasures is acceptable, then the soft combination is quantized and BCH decoded.

BRIEF DESCRIPTION OF THE DRAWINGS

The subject matter regarded as the invention is particularly pointed out and distinctly claimed in the concluding portion of the specification. The inventions however, both as to organization and method of operation, together with objects, features, and advantages thereof, may best be understood by reference to the following detailed description when read wit the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits have not been described in detail so as not to obscure the present invention.

Some embodiments of the present invention provide a novel method and device for managing power consumption of a receiver in stand-by mode by soft decoding words received by the receiver. The receiver may be part of a mobile telephone, a wireless local loop, a pager, a cordless telephone or any other wireless apparatus containing a receiver.

Some embodiments of the present invention operate similarly to Croft in that soft bits of word repetitions are combined prior to BCH decoding. However, in accordance with some embodiments of the present invention, the soft combination is used, along with pattern templates generated from the decision information contained in the soft bits, to generate test patterns, which are then BCH decoded. This is similar to the method described by David Chase in "A Class of Algorithms for Decoding Block Codes with Channel Measurement Information", *IEEE Transactions on Information Theory*, vol IT-18, No. 1, January 1972 for block codes in general, The candidate codeword which is most similar to the soft combination, called the best candidate, is selected, and then the reliability of the best candidate is determined as a function of its similarity to its corresponding test pattern and of all the candidate codewords.

Figure 3:
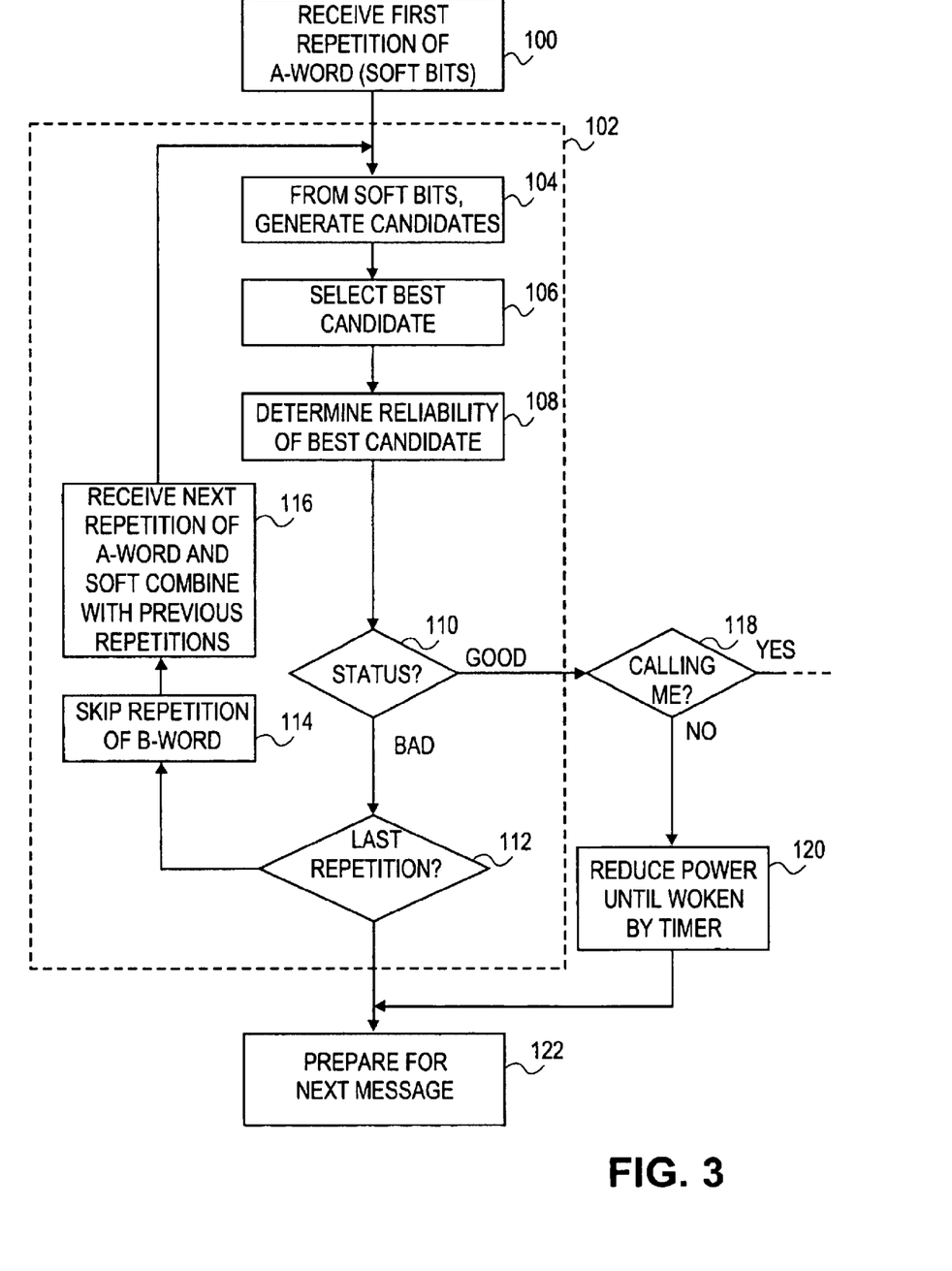
FIG. 3 is a schematic flowchart illustration of the general method of some embodiments of the present invention.

Specifically, FIG. 3 schematically illustrates the general method of some embodiments of the present invention. The receiver receives (step 100) the first repetition of a word. Then a loop 102 begins, in which candidates are generated from the soft bits of the word (step 104), the best candidate is selected (step 106), the reliability of the best candidate is determined (step 108), and the word status is checked (step 110). If the word status is bad and there are more repetitions (step 112), the repetition of the B-word is skipped (step 114), and the next repetition of the A-word is received and soft combined (step 116) with the previous repetitions. This soft combination could be weighted with factors related to the received signal strength indicator (RSSI), which is additional information about groups of bits available in the receiver, Loop 102 then resumes with the generating (step 104) of candidates from the soft combination. The steps of generating candidates (step 104), selecting a best candidate (step 106), and determining the reliability of the best candidate (step 108), will be explained in greater detail below with reference to FIG. 4. If the word status is good, the receiver checks (step 118) whether the beckoning message is addressed to it. If so then talk-mode methods are invoked, as indicated by the ellipsis. If the beckoning message is not addressed to the receiver, the power is reduced (step 120) until a timer causes the power to be restored, at which time the receiver prepares (step 122) for the next message. If the word status is bad and there are no more repetitions of the word, then the message is lost, and the receiver prepares (step 122) for the next message.

The timer of step 120, once synchronized with the dotting and sync preamble of the FOCC (forward control channel) message, is set to wake up the receiver after a predetermined time. This predetermined time corresponds to the fixed length of messages transmitted over the FOCC. In the event that the receiver is powered down during reception of a message, the power is fully restored when the timer reaches the pre-determined time, regardless of at what time the power was reduced. According to some embodiments of the present invention, there is no calculation of the time period beginning when the power is reduced and ending when the next message begins.

Figure 4:
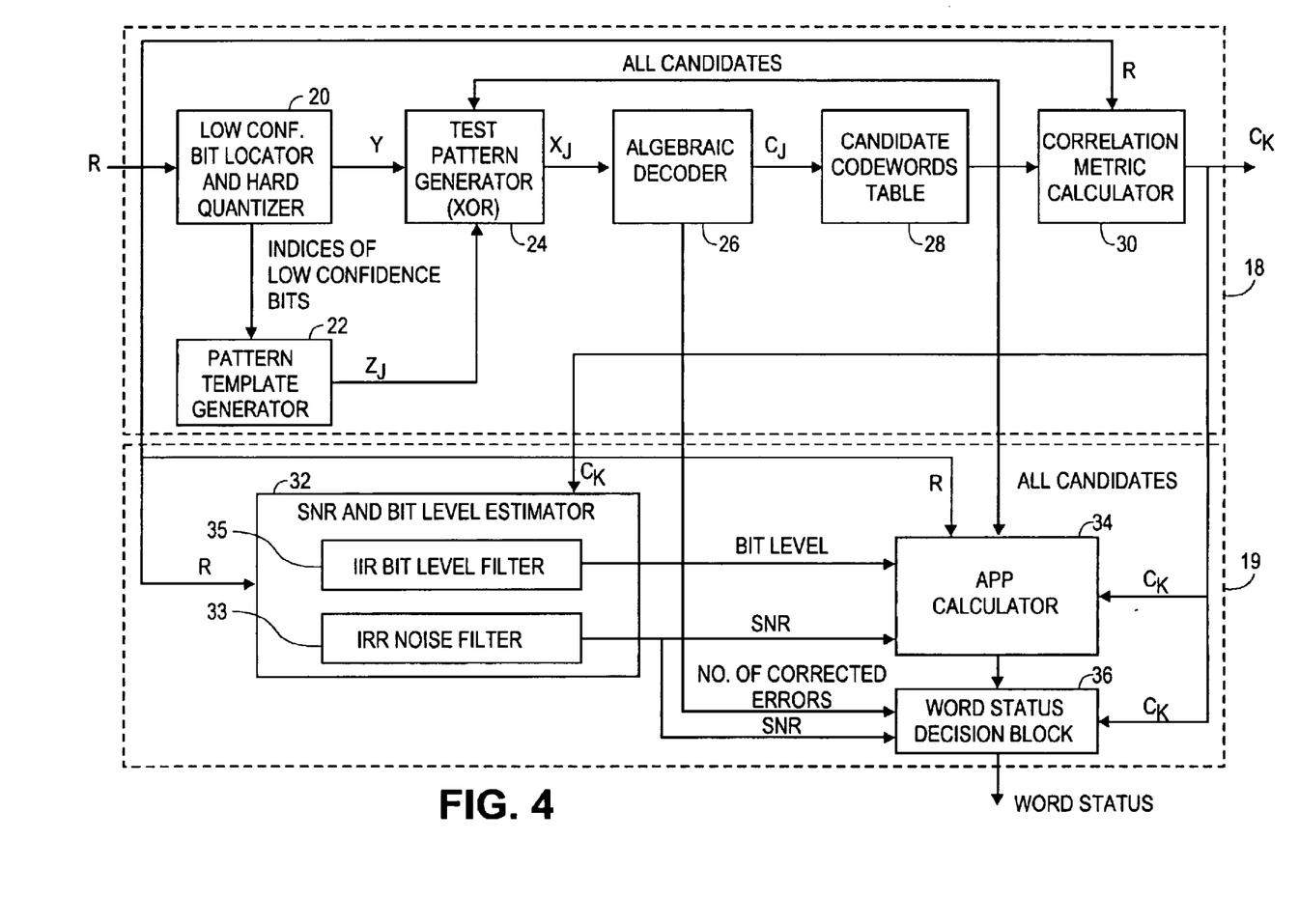
FIG. 4 is a schematic block diagram of the soft BCH decoder which performs some of the steps of FIG. 3, according to some embodiments of the present invention.

Reference is now made to FIG. 4, which is a schematic block diagram of the device which performs the steps 104–108 of the method shown in FIG. 3, according to some embodiments of the present invention. The device comprises a soft decoder 18 and a word reliability unit 19. The soft BCH decoder 18 comprises a low confidence bit locator and hard quantizer 20, a pattern template generator 22, a test pattern generator 24, an algebraic decoder 26, a candidate codewords table 28, and a correlation metric calculator 30. The word reliability unit 19 comprises a bit level and S estimator 32, an APP (a posterior probability) calculator 34 and a word status decision block 36. The bit level and SNR estimator 32 comprises an infinite impulse response (LR) noise filter 33 and an IIR bit level filter 35.

In operation, an input signal R, received as soft bits, is either the first repetition of a word in an FOCC message, or a soft combination of more than one repetition of the word. The low confidence bit locator and hard quantizer 20 converts the soft bits of the input signal R, into hard bits of a 40-bit word Y. The low confidence bit locator and hard quantizer 20 also locates indices of bits of the entire 40-bit word Y having low confidence, without reference to which are data and which are parity bits. In some embodiments of the present invention, t soft bits having low amplitude are identified as having low confidence. In some embodiments of the present invention, the RSSI is used, alone or in conjunction with the amplitude information, to identify low confidence bits. The pattern template generator 22 creates $2^t$ pattern templates, the templates having zeros at the indices of high confidence bits, and every possible combination of zeros and ones at the indices of low coincidence bits. For example, if bit 3 and bit 24 of the 40-bit word Y are found to have the lowest confidence (t=2), four pattern templates are created:

$Z_0$=0000000000000000000000000000000000000000
$Z_1$=0010000000000000000000000000000000000000
$Z_2$=0000000000000000000000001000000000000000
$Z_3$=0010000000000000000000001000000000000000

The test pattern generator 24 adds (modulo-2) the pattern template $Z_0$ to the word Y, thereby creating a new 40-bit word $X_0$, a test pattern. The test pattern $X_0$ is fed into the algebraic decoder 26. The algebraic decoder 26 corrects up to and including two errors in the word $X_0$. If there are more than two errors, the test pattern is rejected. If the algebraic decoder 26 succeeds in producing a candidate codeword $C_0$, then the candidate codeword $C_0$ is added to the candidate codewords table 28. The algebraic decoder 26 corrects up to two errors in the test pattern, using the method described in *Error Control Coding Fundamentals and Applications*, pp. 257–267.

The test pattern generator 24 adds (modulo-2) the next pattern template $Z_1$ to the word Y, hereby creating a new 40-bit word $X_1$, a test pattern. If the test pattern $X_1$ differs by less than three bits from the first candidate codeword $C_0$ in the candidate codewords table 28, then it is not used, as it will produce the same candidate codeword $C_0$ after decoding. If $X_1$ differs by more than two bits from any of the candidate codewords in the candidate codewords table 28, then it is fed into the algebraic decoder 26. If the algebraic decoder 26 succeeds in producing a candidate codeword, it is added to the candidate codewords table 28 as candidate codeword $C_1$. This procedure is repeated for each pattern template. It will be appreciated that the candidate codewords $C_1$ in the candidate codewords table 28 are distinct.

The correlation metric calculator 30 selects the best candidate from the candidate codewords table 28. The saturated Euclidean Metric, which roughly measures how close $C_1$ is to the input signal R, is given by Equation 1:

$$Metric_j = \frac{1}{40 \cdot AverageBitLevel^2} \sum_{i=1}^{40} (R_i - AverageBitLevel \cdot C_{ij})^2 \quad (1)$$

where AverageBitLevel is the estimated level of the incoming soft bits, produced by the bit level and SNR estimator 32, as described hereinbelow with respect to Equations 7 and 8, $R_1$ are the soft bits of the input signal R, $C_{ij}$ are the bits of the candidate $C_j$, $j=0, \ldots,$ and $J_{max}-1$, and $j_{max}$ is the total number of candidates. The best candidate is the candidate $C_k$ that minimizes the metric.

The metric is called "saturated" because the amplitude of the input signal R has been limited by a soft limiter in the receiver before Manchester demodulation. The receiver contains an analog to digital converter whose output is a quantized instantaneous frequency. The soft limiter limits this frequency to be within the range defined by ±1.25 times the standard peak deviation, by replacing input signals outside the range with the limiting value. The standard peak deviation is defined in the Advanced Mobile Phone Service (AMPS) standard as 8 kHz, and in the Japanese Total Access Communication System (JTACS) standard as 6.4 kHz.

It will be appreciated by those skilled in the art that the candidate $C_k$ which minimizes the metric of Equation 1 also maximizes the correlation metric given by Equation 2:

$$CorrelationMetric_j = \sum_{i=1, C_{ij} \neq C_{i0}}^{40} R_i \cdot C_{ij} \quad (2)$$

The correlation metric calculator 30 calculates the correlation metric from only those bits which differ from the bits of candidate codeword $C_0$, and does not require any knowledge of the average bit level. For example, if the candidate codeword $C_0$ is $C_0$=0011001001011100011100101011110001010101 and the candidate codeword $C_j$ is $C_j$=1100001001011100011100101011110001010101, then $C_j$ differs from $C_0$ only in the first four bits of the 40-bit word, and the correlation metric for the candidate codeword $C_j$ then has the value $R_1 C_{1j} + R_2 C_{2j} + R_3 C_{3j} + R_4 C_{4j}$.

Once the correlation metric calculator 30 has selected the best candidate $C_k$, it must be determined whether the best candidate $C_k$ is reliable or not. There are a number of methods for determining reliability of a received word. According to some embodiments of the present invention, the APP calculator 34 calculates the APP of the best candidate $C_k$, in a method similar to that described in Proakis, *Digital Communications*, 3$^{rd}$ edition, McGraw-Hill (1995), p. 21. If the APP of the best candidate $C_k$ is less than a given threshold, and the best candidate $C_k$ is not identical to the corresponding test pattern $X_k$, the word status is said to be bad, and the next repetition of the word will be received and soft combined with previous repetitions.

The APP gives the probability of the selected code, $P(C_k/R)$, which is the probability tit candidate $C_k$ is transmitted by the base station when the input signal is R. A formula for the APP is given in Equation 3:

$$APP = P(C_k / R) \cong \frac{1}{1 + \sum_{j \in A, j \neq k} \prod_{i \in B} \alpha_i \left( \frac{C_{ij} - C_{ik}}{2} \right)}, \quad (3)$$

where k is the index of the best candidate in the candidates' table 28, A is the set of all candidates in the candidates' table 28, B is the set of all bits that are not identical in all candidates, and $C_y$ are the bits of candidate $C_j$. It will be appreciated that the APP for the best candidate is calculated from all of the candidates.

The coefficient $\alpha_1$ in Equation 3 is defined as $\alpha_1$=exp(−2·SNR·$R_1$/AverageBitLevel), where SNR is the signal-to-noise ratio of the input signal, and $R_1$ are the soft bits of the input signal. The bit level and SNR estimator 32 estimates the SNR, which is the ratio of signal power to noise power, as given in Equation 4:

$$SNR = \frac{AverageBitLevel^2}{AverageNoiseVariance}, \quad (4)$$

where AverageNoiseVariance and AverageBitLevel are determined as follows.

Initially, the noise variance EstimatedNoiseVariance is estimated using the formula given in Equation 5:

$$EstimatedNoiseVariance = \max \left\{ \begin{array}{c} \frac{1}{40} \sum_{i=1}^{40} R_i^2 - AverageBitLevel^2, \\ \frac{NominalBitLevel^2}{100} \end{array} \right\}, \quad (5)$$

where the nominal bit level NominalBitLevel is the bit level of a noiseless signal, which is the standard peak deviation mentioned hereinabove, multiplied by the number of samples per bit.

The estimated noise variance is passed through the IIR noise filter 33 to reduce the variance, and produce the average noise variance AverageNoiseVariance, as given in Equation 6:

AverageNoiseVariance=AverageNoiseVariance·(1−AverageStep)+
EstimatedNoiseVariance·AverageStep,    (6)

where AverageStep is the forgetting factor of the IIR noise filter 33. The forgetting factor is a measure of how much the peaks and valleys of the input are smoothed out by the IIR noise filter 33.

The bit level and SNR estimator 32 estimates the average bit level AverageBitLevel from the estimated bit level. The estimated bit level EstimatedBitLevel is related to the correlation between the best candidate and the incoming soft bits, as given in Equation 7:

$$EstimatedBitLevel = \frac{1}{40} \sum_{i=1}^{40} R_i \cdot C_{ik}, \quad (7)$$

where $C_{1k}$ are the bits of the best candidate $C_k$. The IIR bit level filter 35 reduces the variance of the estimated bit level, and produces the average bit level AverageBitLevel as follows in Equation 8:

AverageBitLevel=AverageBitLevel·(1−AverageStep)+
EstimatedBitLevel·AverageStep,    (8)

where AverageStep is the forgetting factor of the m bit level filter 35. When the receiver is first powered on, the calculation of the average bit level AverageBitLevel given in Equation 8 could lead to a negative or zero average bit level, which would in turn lead to a physically impossible value for the coefficient $\alpha_i$, used in Equation 3. Therefore, if the average bit level AverageBitLevel calculated from Equation 8 falls below a minimum bit level MinimumBitLevel, then the minimum bit level MinimumBitLevel is used instead of the average bit level AverageBitLevel in the calculation of the coefficient $\alpha_i$. According to some embodiments of the present invention, the minimum bit level MinimumBitLevel is set to 0.2 times the nominal bit level NominalBitLevel described hereinabove with respect to Equation 5.

As mentioned hereinabove, the word status decision block 36 compares the result of the APP calculation (Equation 3)

to a threshold. If the APP of the best candidate $C_k$ is less than the threshold, which is given in Equation 9:

$$Threshold = \frac{1}{1 + \exp(-2.5 - SNR)}, \qquad (9)$$

and the output of the algebraic decoder 26 indicates that errors were corrected when decoding $X_k$ to $C_k$, then the word status of the best candidate $C_k$ is considered bad, and the next repetition of the word will be received and soft combined with previous repetitions.

Simulations of the receiver of some embodiments of the present invention were conducted, and the results compared with a receiver according to Croft. Constant parameter values for the simulation are given in Table 1:

| Parameter Name | Value |
|---|---|
| AverageStep (forgetting factor of IIR filter) | 0.01 |
| t (number of low confidence bits) | 6 |
| j$_{max}$ (number of candidates) | 8 |

Simulations were conducted both for static channel (Additive White Gaussian Noise (AWGN)) conditions and for Rayleigh fading channel conditions with a vehicle speed of 32 kilometers per hour.

Figure 5:
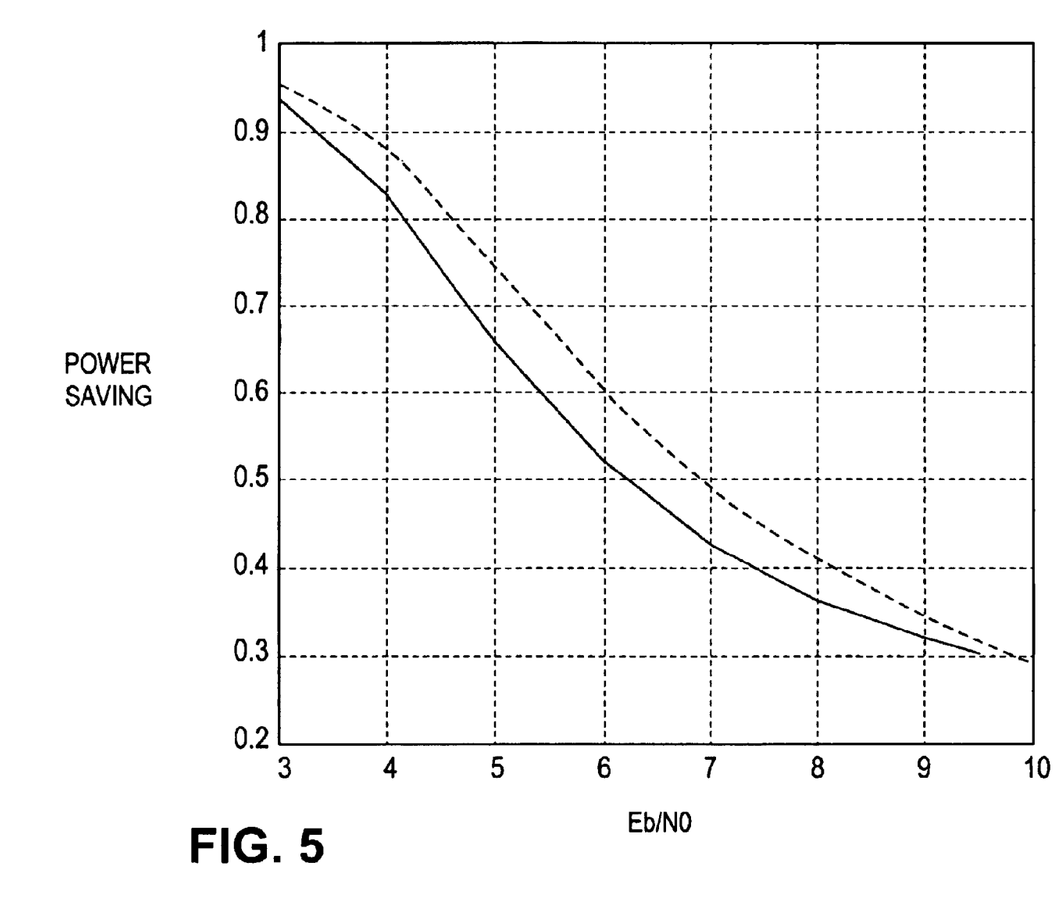
FIG. 5 is a graph comparing the power saving on a static channel of a receiver according to some embodiments of the present invention, and that of a receiver according to Croft.
Figure 6:
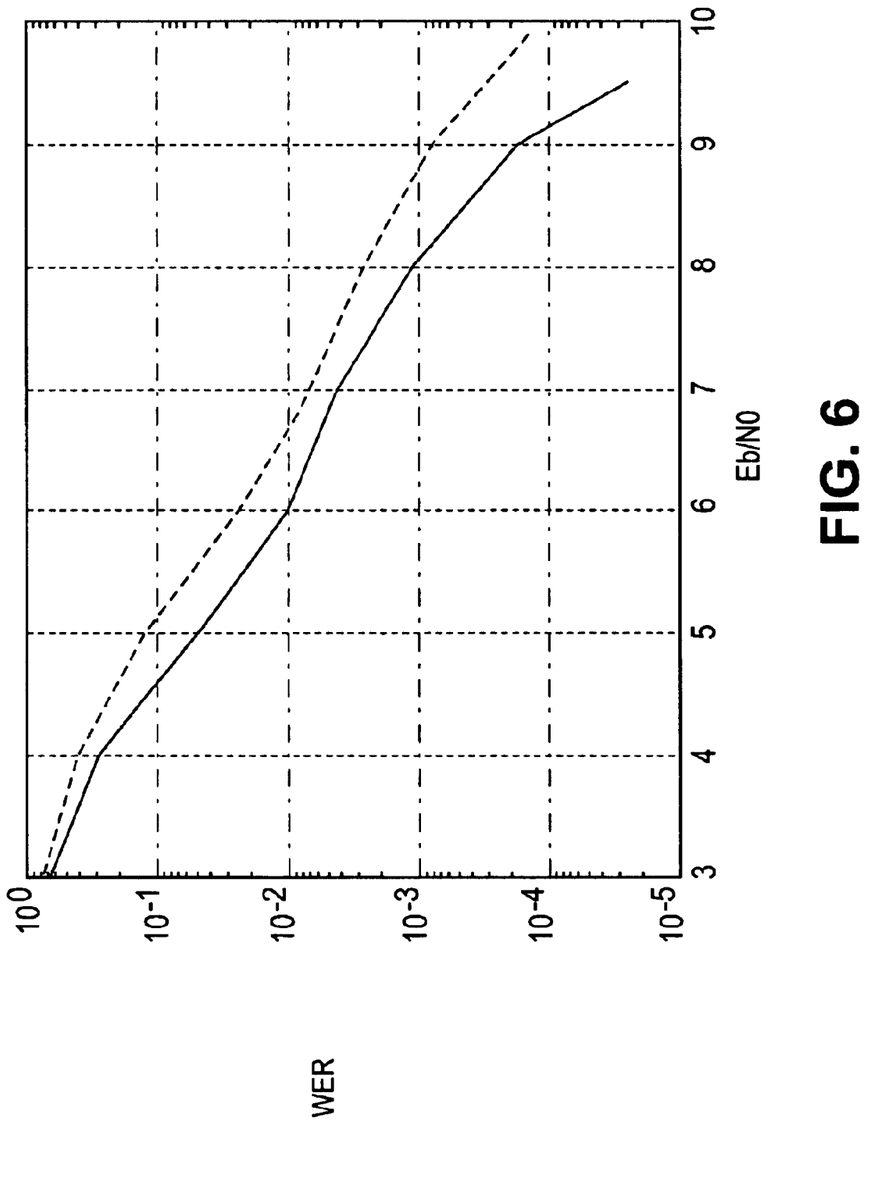
FIG. 6 is a graph comparing the word error rate (WER) on a static channel of a receiver according to some embodiments of the present invention, and that of a receiver according to Croft.
Figure 7:
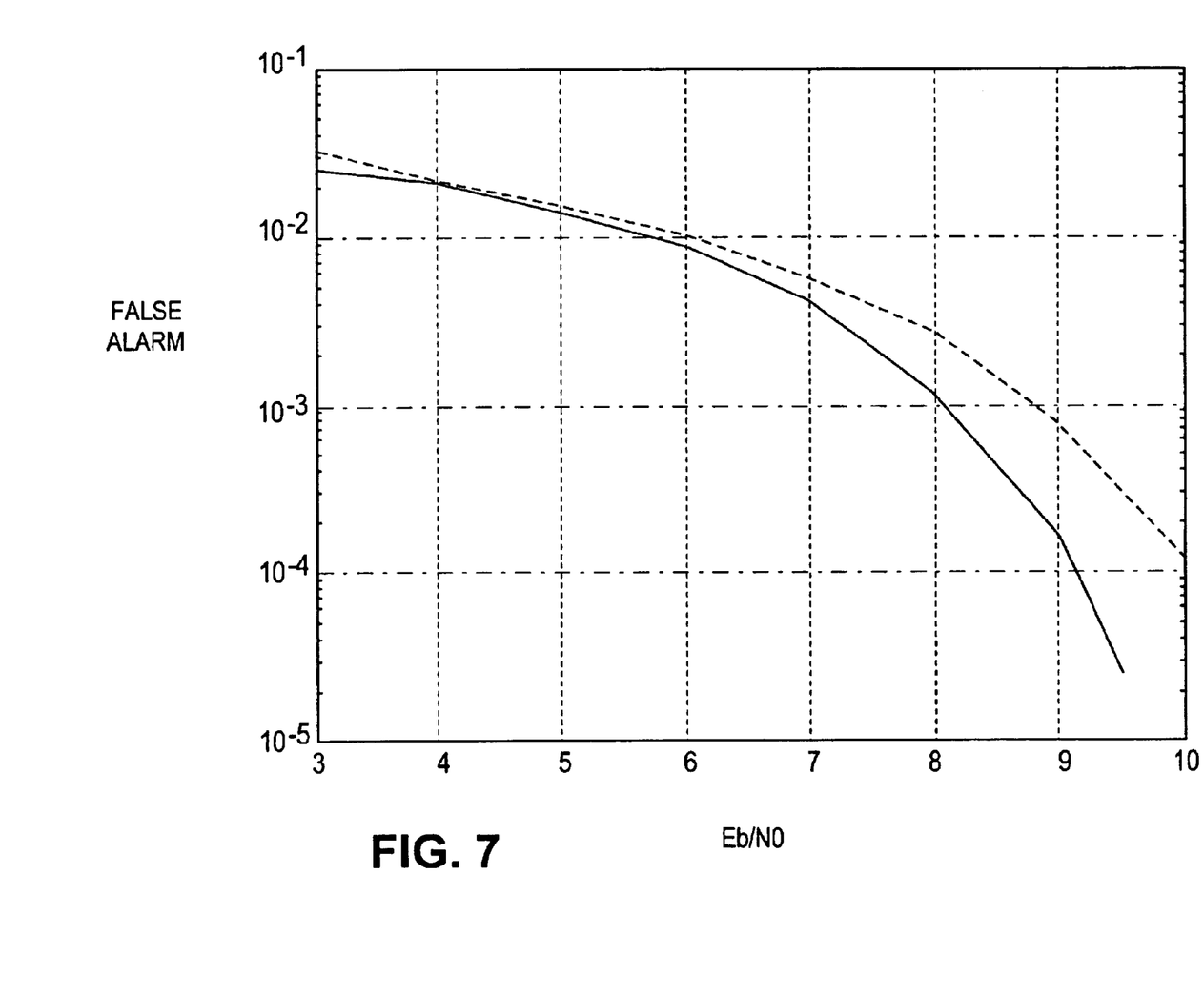
FIG. 7 is a graph comparing the false alarm rate on a static channel of a receiver according to some embodiments of the present invention, and that of a receiver according to Croft.
Figure 8:
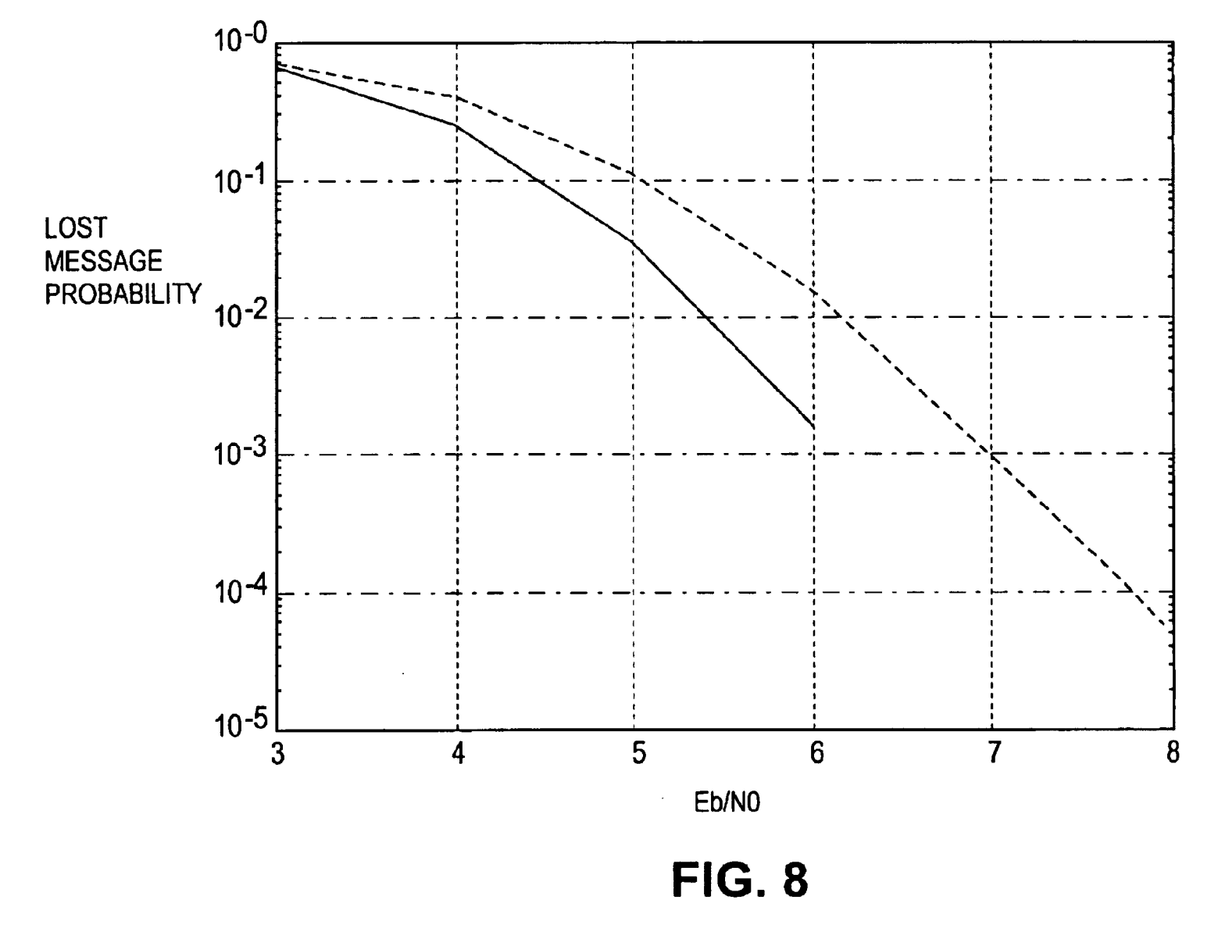
FIG. 8 is a graph comparing the probability of a lost message on a static channel of a receiver according to some embodiments of the present invention, and that of a receiver according to Croft.

The results of tie static channel simulation, comparing a receiver according to some embodiments of the present invention to a receiver according to Croft, are shown in FIGS. 5, 6, 7 and 8, to which reference is now made. FIG. 5 is a graph of percentage power saving (PPS) versus channel SNR (in units of Eb/N0, where Eb is Energy per bit and N0 is Noise Power Spectral Density). A PPS value of 1 indicates no saving of power, and a PPS value of 0.1 indicates a 90% saving of power, FIG. 6 is a graph of the word error rate (WER) versus channel SNPR. FIG. 7 is a graph of the false alarm rate versus channel SNR. FIG. 8 is a graph of the probability of a lost message versus channel SNR. In each of the graphs, a receiver according to some embodiments of the present invention is shown as a solid line, whereas a receiver according to Croft is shown as a dashed line. It can be seen from the graphs that the receiver of some embodiments of the present invention performs better at all channel SNRs than a receiver according to Croft, with more power savings, a lower WER, a lower rate of false alarms and a smaller probability of lost messages.

Figure 9:
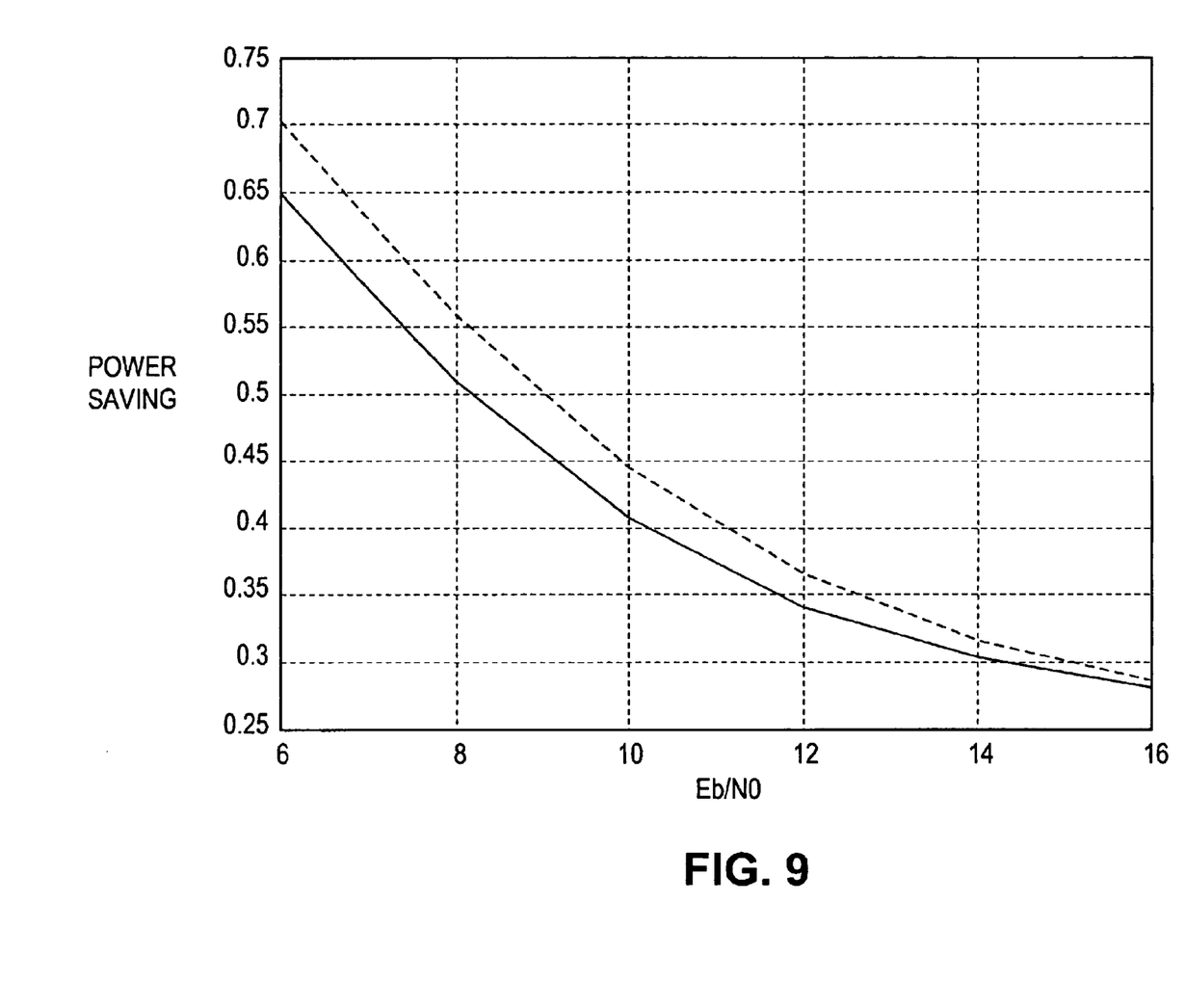
FIG. 9 is a graph comparing the power saving on a fading channel of a receiver according to some embodiments of the present invention, and that of a receiver according to Croft.
Figure 10:
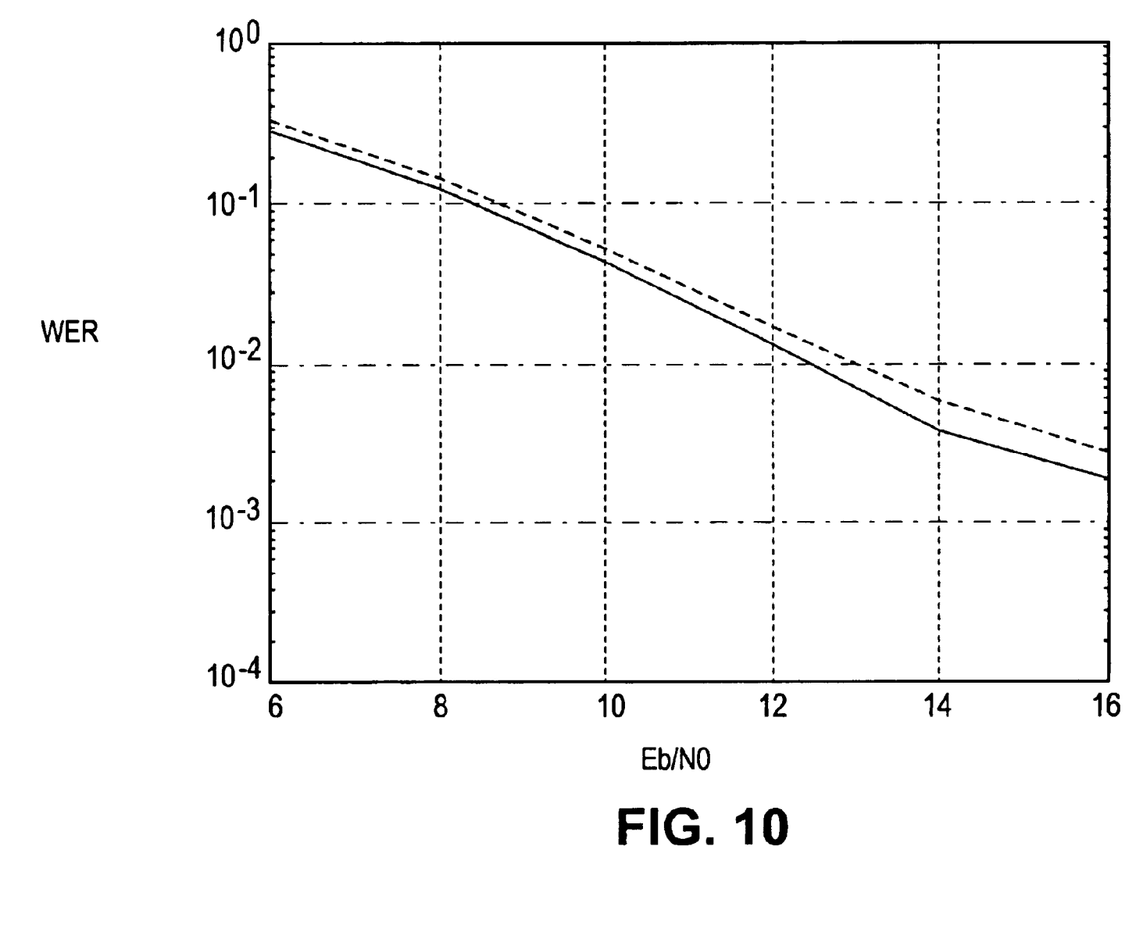
FIG. 10 is a graph comparing the word error rate (WER) on a fading channel of a receiver according to some embodiments of the present invention, and that of a receiver according to Croft.
Figure 11:
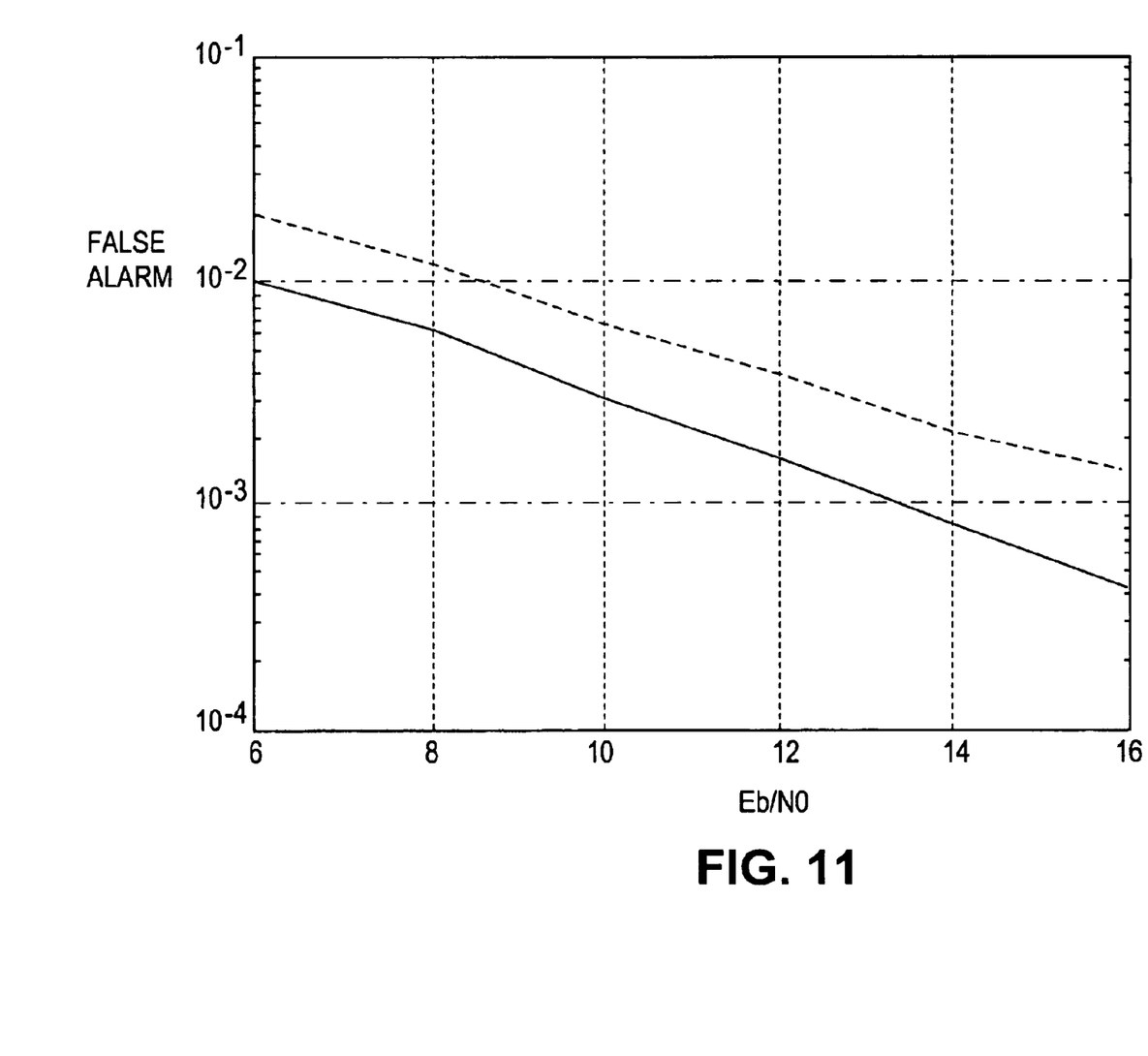
FIG. 11 is a graph comparing the false alarm rate on a fading channel of a receiver according to some embodiments of the present invention, and that of a receiver according to Croft.
Figure 12:
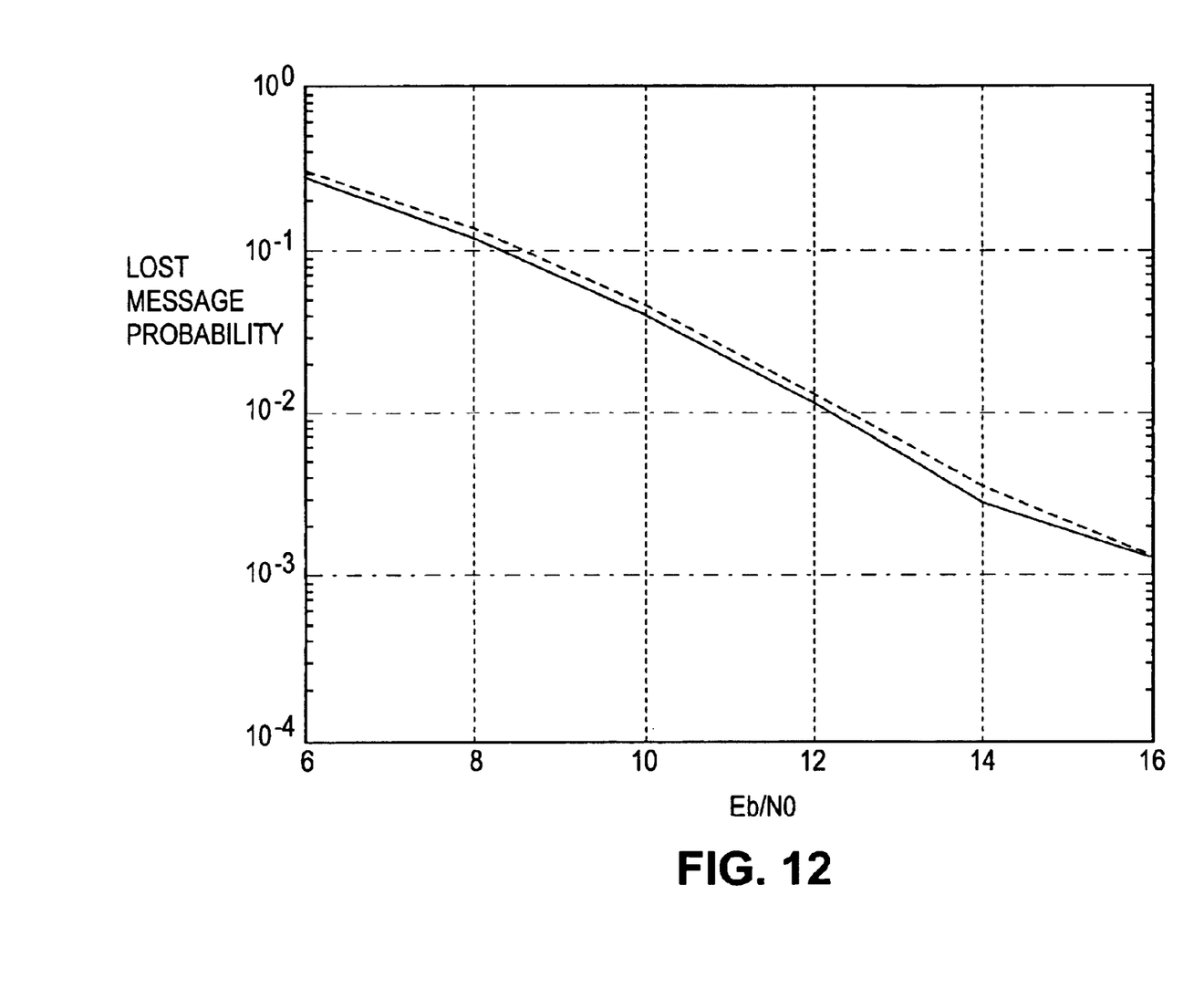
FIG. 12 is a graph comparing the probability of a lost message on a fading channel of a receiver according to some embodiments of the present invention and that of a receiver according to Croft.

The results of the fading channel simulation, comparing a receiver according to some embodiments of the present invention to a receiver according to Croft, are shown in FIGS. 9, 10, 11 and 12, to which reference is now made. FIG. 9 is a graph of percentage power saving (PPS) versus channel SNR, where a PPS value of 1 indicates no saving of power, and a PPS value of 0.1 indicates a 90% saving of power. FIG. 10 is a graph of the word error rate (WER) versus channel SNR. FIG. 11 is a graph of the false alarm rate versus channel SNR. FIG. 12 is a graph of the probability of a lost message versus channel SNR. In each of the graphs, a receiver according to some embodiments of the present invention is shown as a solid line, whereas a receiver according to Croft is shown as a dashed line. It can be seen from the graphs that the receiver according to some embodiments of the present invention performs better at all channel SNRs than a receiver according to Croft, with more power savings, a lower WER, a lower rate of false alarms and a smaller probability of lost messages.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A device comprising:
    a soft decoder to produce a codeword by soft decoding one or more repetitions of a word received by a receiver, the soft decoder including,
        a candidate generator, to generate one or more candidates based, at least in part, on said one or more repetitions, and
        a selector, responsive to the candidate generator, to select a best candidate from said one or more candidates as said codeword; and
    a power reducer, to reduce power to said receiver when a message contained in said codeword is not addressed to said receiver.

2. The device of claim 1, wherein said candidate generator comprises:
    a locator to identify locations of one or more low confidence bits in said one or more repetitions;
    a test pattern generator to generate two or more test patterns based upon said one or more repetitions and said pattern templates; and
    an algebraic decoder to decode one or more of said test patterns to produce said candidates.

3. The device of claim 1, wherein said selector comprises a correlation metric calculator to calculate a correlation metric, and said best candidate is a candidate which minimizes said correlation metric.

4. The device of claim 1 further comprising:
    a determiner to determine the probable reliability of said codeword.

5. The device of claim 4, wherein said determiner comprises:
    an estimator to produce an average bit level estimate and a signal to noise ratio estimate for said one or more repetitions;
    a calculator to calculate a probability associated with said codeword, based upon said estimates; and
    a decision block to decide the reliability of said codeword based upon said probability.

6. The device of claim 1, wherein said receiver is part of a mobile telephone, local loop, a pager or a cordless telephone.

7. A method comprising:
    soft decoding one or more repetitions of a word received by a receiver to produce a codeword, the soft decoding including:
        generating one or more candidates based upon said one or more repetitions, and
        selecting a best candidate from said one or more candidates as said codeword; and
    reducing power to said receiver when a message contained in said codeword is not addressed to said receiver.

8. The method of claim 7, wherein selecting said best candidate comprises:
    calculating a correlation metric for each candidate; and
    choosing the candidate which minimizes said calculated correlation metric as said best candidate.

9. The method of claim 7 further comprising:
    determining the probable reliability of said codeword.

10. The method of claim 9, wherein determining said probable reliability comprises:

determining said probable reliability based on soft decision variables associated with bits of said received repetitions.

11. The method of claim 9 wherein determining said probable reliability comprises:

determining said probable reliability based on an a posteriori probability (APP) for said best candidate.

12. The method of claim 7, further comprising:

combining one of said repetitions with previous repetitions of said word to form a combination; and generating one or more candidates from information contained in said combination.

13. The method of claim 12, wherein combining one of said repetitions with previous repetitions comprises:

multiplying bits of all said repetitions by weight factors to produce products; and accumulating said products.

14. The method of claim 13, wherein said weight factors are based upon received signal strength indicator (RSSI) information for identification of low confidence bits.

15. The method of claim 12, wherein generating said candidates comprises:

identifying locations of one or more low confidence bits of said combination;

generating two or more pattern templates based upon said locations;

generating two or more test patterns based upon said combination and said pattern templates; and decoding one or more of said test patterns.

16. The method of claim 15, wherein identifying said locations of one or more low confidence bits comprises:

identifying said locations of one or more low confidence bits by using soft decision variables associated with bits of said received repetitions.

17. The method of claim 15, wherein identifying said locations of one or more low confidence bits comprises:

identifying said locations of one or more low confidence bits by using received signal strength indicator (RSSI) information.

18. The method of claim 7, wherein said method further comprises:

restoring power to said receiver when a timer reaches a predetermined time, independent of at what time reducing said power occurred.

19. A cellular telephone system comprising:

a mobile station comprising:

a receiver to receive repetitions of a word containing a message possibly addressed to said mobile station;

a soft decoder to produce a codeword by soft decoding one or more of said repetitions, said soft decoder including:

a candidate generator, to generate one or more candidates based, at least in part, on said one or more repetitions, and a selector, responsive to the candidate generator, to select a best candidate from said one or more candidates as said codeword; and a power reducer to reduce power to said receiver when said message contained in said codeword is not addressed to the mobile station; and one or more dipole antenna(e), coupled to the receiver of the mobile station, through which communication between the mobile station and a base station is achieved.

20. The system of claim 19, a base station, communicatively coupled to the mobile station through a wireless communication channel, wherein the base station provides coverage for a geographical cell of between approximately 3 and 24 square kilometers.

21. The system of claim 19, wherein said candidate generator comprises:

a locator to identify locations of one or more low confidence bits in said one or more repetitions;

a pattern template generator to generate two or more pattern templates based upon said locations; and an algebraic decoder to decode one or more of said test patterns to produce said candidates.

22. The system of claim 19, wherein said selector comprises a correlation metric calculator to calculate a correlation metric, and said best candidate is a candidate which minimizes said correlation metric.

* * * * *

UNITED STATES PATENT AND TRADEMARK OFFICE
CERTIFICATE OF CORRECTION

PATENT NO. : 6,751,451 B2
DATED : June 15, 2004
INVENTOR(S) : Rainish et al.

It is certified that error appears in the above-identified patent and that said Letters Patent is hereby corrected as shown below:

Column 1,
Line 24, delete "math" and insert -- with --.
Line 53, delete "knits" and insert -- transmits --.

Column 5,
Line 30, delete "receiver," and insert -- receiver. --.
Line 67, delete "S" and insert -- SNR --.

Column 6,
Line 43, delete "hereby" and insert -- thereby --.

Column 7,
Line 61, delete "$C_y$" and insert -- $C_{ij}$ --.

Column 9,
Line 28, delete "tie" and insert -- the --.
Line 35, delete "power," and insert -- power. --.
Line 37, delete "SNPR" and insert -- SNR --.

Signed and Sealed this

Twenty-first Day of September, 2004

JON W. DUDAS
*Director of the United States Patent and Trademark Office*